United States Patent [19]

Spitz

[11] Patent Number: 5,425,110
[45] Date of Patent: Jun. 13, 1995

[54] METHOD AND APPARATUS FOR AUTOMATIC LANGUAGE DETERMINATION OF ASIAN LANGUAGE DOCUMENTS

[75] Inventor: A. Lawrence Spitz, Palo Alto, Calif.

[73] Assignees: Xerox Corporation, Stamford, Conn.; Fuji Xerox Corporation, Tokyo, Japan

[21] Appl. No.: 47,673

[22] Filed: Apr. 19, 1993

[51] Int. Cl.⁶ .............................................. G06K 9/46
[52] U.S. Cl. .................................. 382/192; 382/224; 382/173
[58] Field of Search ...................... 382/36, 39, 40, 10, 382/18, 9, 16, 19, 25, 26, 28; 364/419.01, 419.02, 419.03, 419.04

[56] References Cited

U.S. PATENT DOCUMENTS

| | | | |
|---|---|---|---|
| 3,755,780 | 8/1973 | Sammon et al. | 382/18 |
| 4,516,262 | 5/1985 | Sakurai | 382/36 |
| 4,817,186 | 3/1989 | Goolsbey et al. | 382/48 |
| 5,062,143 | 10/1991 | Schmitt | 382/36 |
| 5,181,259 | 1/1993 | Rorvig | 382/36 |
| 5,253,307 | 10/1993 | Wayner et al. | 382/22 |

Primary Examiner—Joseph Mancuso
Assistant Examiner—Jon Chang
Attorney, Agent, or Firm—Oliff & Berridge

[57] ABSTRACT

An automatic language determining apparatus automatically determines the particular Asian language of the text image of a document when the gross script-type is known to be, or is determined to be, an Asian script-type. A connected component generating means generates connected components from the pixels comprising the text image. A character cell generating means generates a character cell surrounding at least one connected component. An optical density determining means determines the optical density, in absolute numbers or percentage of pixels, of the pixels within each character cell. A script feature determining means first generates a histogram, then converts, by linear discriminate analysis, the histogram to a point in a new coordinate space. A language determining means compares the determined point of the text portion in the new coordinate space to predetermined regimes in the new coordinate space corresponding to at least one Asian language to determine the particular Asian language of the text image.

13 Claims, 7 Drawing Sheets

METHOD AND APPARATUS FOR AUTOMATIC LANGUAGE DETERMINATION OF ASIAN LANGUAGE DOCUMENTS

BACKGROUND OF THE INVENTION

1. Field of the Invention

The present invention relates to a method and apparatus for automatic document recognition and, more particularly, to a method for automatically determining the language of the characters of the document.

2. Description of Related Art

Optical character recognition and the use of optical character recognition to convert scanned image data into text data suitable for use in a digital computer is well known. In addition, methods for converting scanned image data into text data and the types of errors such methods generate are well known. However, the proper selection of the character recognition method is highly dependent upon the script (alphabet or ideogram) used in the document. Further, the selection of a proper method for error correction is highly dependent upon the language of the document. Conventionally, the methods for optical character recognition and for error correction in optical character recognition systems have been provided on the assumption that the script and language used in the document is the usual script and language of the country in which the system is being used. That is, in the United States, conventional optical character recognition systems would assume that the document is in English and uses Roman script, while in Japan, an applicable character recognition system would be implemented assuming that the language is Japanese and uses the Japanese scripts. Alternately, an optical character recognition system can be implemented with the character recognition and error resolution methods for a plurality of languages.

However, it has heretofore not been possible to have the optical character recognition system automatically determine the script type and/or language of the document. Rather, as each document is provided to the optical character recognition system, some indication of the particular language and script of the document must be given to the optical character recognition system. This has been accomplished by either having the operator input data concerning the language and script of the document to the optical character recognition system, or by having the document provided with special markings which indicate the language and script of the document.

SUMMARY OF THE INVENTION

It is therefore an object of the present invention to provide an optical character recognition system having automated language recognition capabilities.

It is another object of the present invention to provide a method for determining the particular language of the document based on the determined script type.

It is a further object of the present invention to determine the language of a document based on script features.

It is yet another object of the present invention to determine the particular language of an Asian script document.

According to a first embodiment of the preferred method and apparatus of the present invention, once the script of a text portion of a document has been determined as being an Asian script-type, the plurality of character cells each surrounding one or more connected components forming a character of the text portion are analyzed to determine the optical density within the character cells.

If the text portion of the document has not been converted to a representative digital data signal, the document is scanned, and all non-text information is removed. The resulting text image is then corrected for skew and other scanning artifacts (if necessary). Once the document image has been scanned and cleaned up, the image is converted from a bitmap of pixels having locations and image densities to a plurality of connected components. After generating the connected components, a bounding box is generated for each connected component. Line and character dimensions are determined to establish the boundaries of character cells in the text portion. Based on the determined distribution of the optical density of the character cells, the particular Asian language of the text of the document is determined.

BRIEF DESCRIPTION OF THE DRAWINGS

The invention is described in relation to the accompanying drawings, in which.

DETAILED DESCRIPTION OF THE PREFERRED EMBODIMENTS

Figure 1:
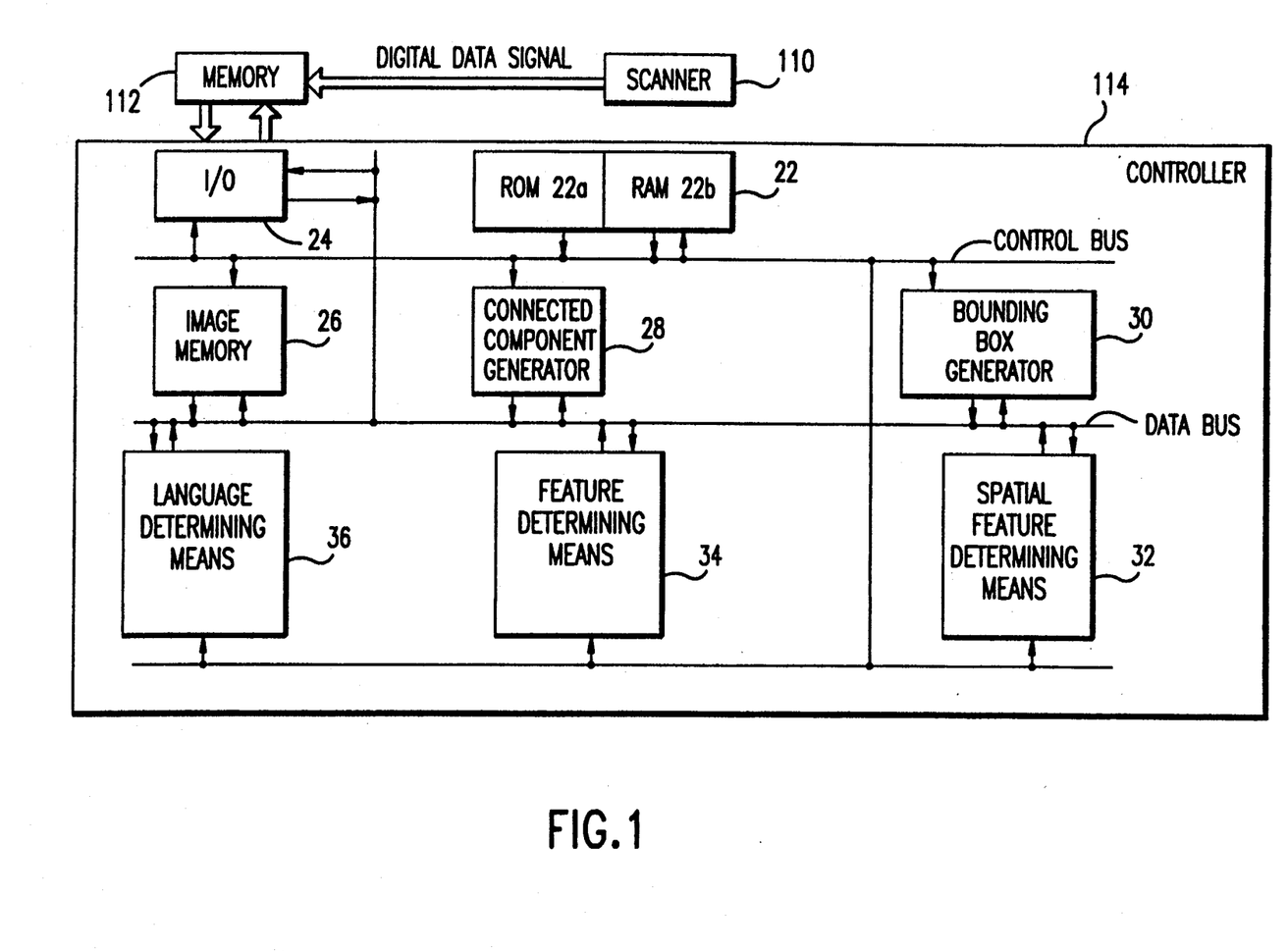
FIG. 1 shows a block diagram of an optical character recognition system.
Figure 2:
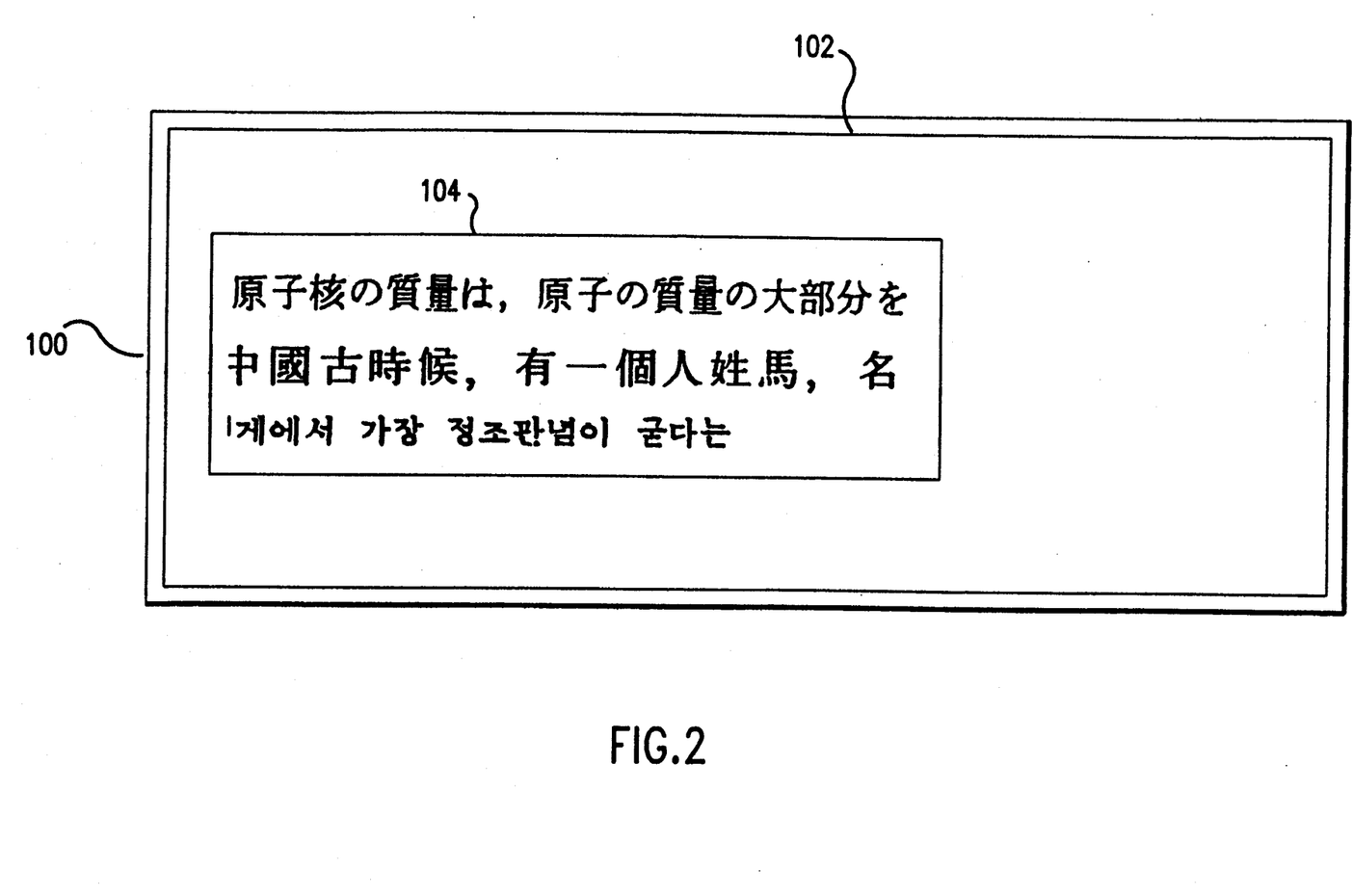
FIG. 2 shows a document having three sample text portions, one each of Korean (Hangul), Chinese, and Japanese scripts.

As shown in FIG. 1, a optical character recognition system of the present invention comprises a scanner 110 having a charge coupled device (CCD) or the like. The scanner 110 scans a document 100 having an image 102 (a sample image 102 comprising three text strings of unknown script and language is shown in FIG. 2), and outputs a digital data signal representative of the location and image density of a plurality of pixels comprising the image 102 of the original document 100. This digital data signal is sent to a memory 112, where it is stored temporarily or indefinitely. The digital data signal, when output from the memory 112, is input to a general purpose digital computer 114. Once input to computer 114, the digital data signal is first cleaned up by removing any non-text portions of the image 102, leaving a text portion 104. Further, any scanner artifacts of the digital data signal, such as skew or the like, are corrected for. The cleaned up digital data signal is then restored to the memory 112 or stored in a memory of the computer 114. Alternatively, the scanner can provide some of the preprocessing, such as removal of scanner artifacts.

As shown in FIG. 1, the general purpose digital computer 114 of the present invention comprises a memory 22 for storing a control program, an input/output circuit 24 for inputting the digital data signal from the memory 112 and for outputting a signal representative of the determined script type of the image 102. The general purpose computer 114 also comprises an image memory 26 for storing the digital data signal, a connected component generating means 28 for generating connected components from the digital data signal; bounding box generating means 30 for determining the coordinates of the bounding box and the pixels of the digitized image within the bounding box for each of the connected components; spatial feature determining means 32 for generating character cells comprising one or more connected components; feature determining means 34 for determining the distribution of one or more types of predetermined features for each of the bounding boxes; and a language determining means 36 for determining the language of the document. The memory 22 for storing the control program may comprise either a ROM 22a or a RAM 22b.

In operation, the document 100 containing the image 102, as shown in FIG. 1, is placed into and scanned by the scanner 110 to generate a serial or parallel digital data signal. The digital data signal comprises a plurality of signal portions, each portion representative of a corresponding pixel of the original image 102. Each pixel of the image 102 has a location in the image 102 and an image density. Accordingly, each signal portion of the digital data signal includes data representative of the location and image density of the corresponding pixel.

The digital data signal output by the scanner 110 is then stored in the memory 112. The memory 112 may comprise a RAM, a flash memory, a disk memory or the like. Regardless of the type of memory 112, the digital data signal is stored in the memory 112 in response to the location and image density data within each signal portion. Of course, it is understood that the digital data signal can be directly input to the general purpose digital computer 114, rather than into the intermediate memory 112. Alternately, the memory 112 can be incorporated into the general purpose digital computer 114. In any case, it is understood that the memory 112 is used to provide long-term storage of the image 102.

Once the operator has completed inputting documents into the scanner 110 or the system otherwise determines that the digital data signal representative of the image 102 should be converted to text data, the digital data signal representative of the image 102 is output from the memory 112 to the general purpose computer 114. It is of course understood that a special purpose digital computer or hardwired logic circuit can be used in place of the general purpose digital computer 114.

The digital image data signal stored in the memory 112 is output to the general purpose computer 114, where it is input through the input/output means 24 to an image memory 26. In a first preferred embodiment of the present invention, when the gross script-type is known to be Asian, the feature determining means 34 is set to a preselected feature for distinguishing between Korean, Chinese and Japanese language documents. Of course, it is understood that if the gross script-type of the text portion is not identified or known to be an Asian script type, the method and apparatus for determining the gross script classification, as described in U.S. application Ser. No. 08/047,515, assigned to the same assignee as the present application and incorporated herein by reference, can be used.

Once the digital data signal has been completely stored in the image memory 26, the digital data signal is then made available to the connected component generating means 28. The connected component generating means 28 divides the digital data signal representative of the text portion 104 of the image 102 into a plurality of connected components, each connected component comprising one or more signal portions. Each connected component comprises signal portions corresponding to those pixels of the original image 102 which have a certain minimum image density and form a continuous path. Each script character generally corresponds to one connected component, as in the "F" of "Fuji" or more than one connected component, as in the "j" or "i" in "Fuji".

Once the connected component generating means 28 generates the plurality of connected components for the text portion 104 from the digital data signal, the digital data signal corresponding to the text portion 104 and the list of connected components generated by the connected component generating means 28 is stored to the image memory 26 and output to the bounding box generating means 30.

The bounding box generating means 30 redivides the digital data signal representative of the text portion 104 into a plurality of bounding boxes, each bounding box containing one connected component and zero, one or more signal portions of the digital data signal corresponding to pixel locations adjacent to the pixels comprising the connected component. The dimensions of each bounding box are determined by the location data of the leftmost, rightmost, uppermost and bottommost signal portions comprising the corresponding connected component. Accordingly, the signal portions within the bounding box are those comprising the connected component and those signal portions having a location data placing them within the boundaries of the bounding box, regardless of their image density data. Once the list of bounding boxes and the signal portions comprising each bounding box has been generated by the bounding box generating means 30, the list of bounding boxes and the corresponding signal portions is stored to the image memory 26 and output to the spatial feature determining means 32. The spatial feature determining means 32 determines the lines, words and/or character cells of the text portion using any one of a variety of methods. One such method is described in U.S. application Ser. No. 08/047,515, assigned to the same assignee as the present application and incorporated herein by reference.

Figure 3:
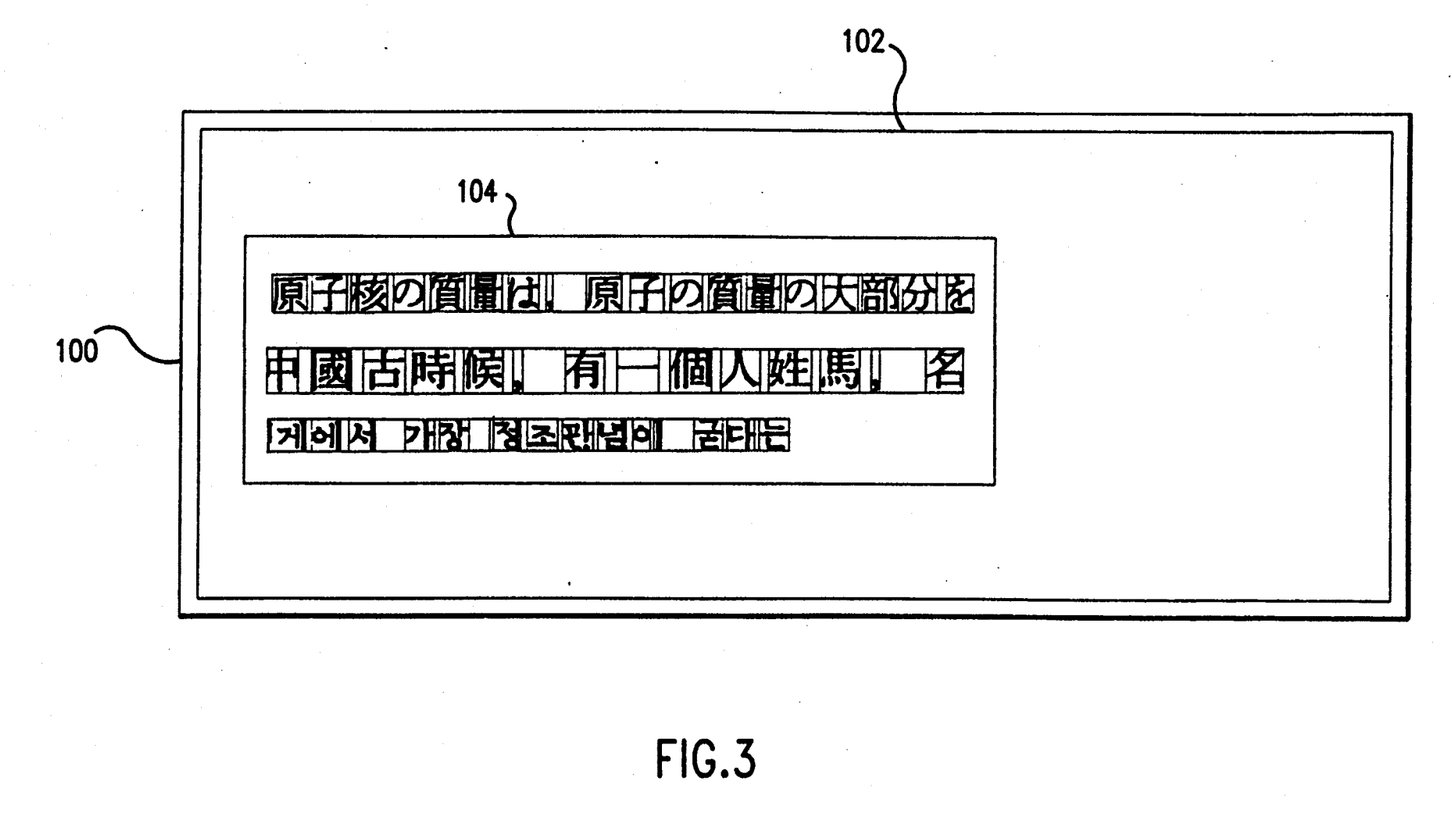
FIG. 3 shows the text portions of FIG. 2 with character cells around the connected components.

In the first preferred embodiment, the optical density script feature is used by the feature determining means 34 to distinguish between Korean, Chinese and Japanese language documents. FIG. 2 shows three samples of Asian language texts comprising the text portion 104 of image 102 of document 100. The connected component generating means 28 determines each connected component for the text portion 104. The bounding box generating means 30 then determines the bounding boxes for each connected component. The spatial feature determining means 32 then determines the character cells as shown in FIG. 3. Of course, if any of these operations have already been completed during a previous gross script classification operation or character cell generating operation on the text portion 104, it would not be necessary to repeat them.

Figure 4:
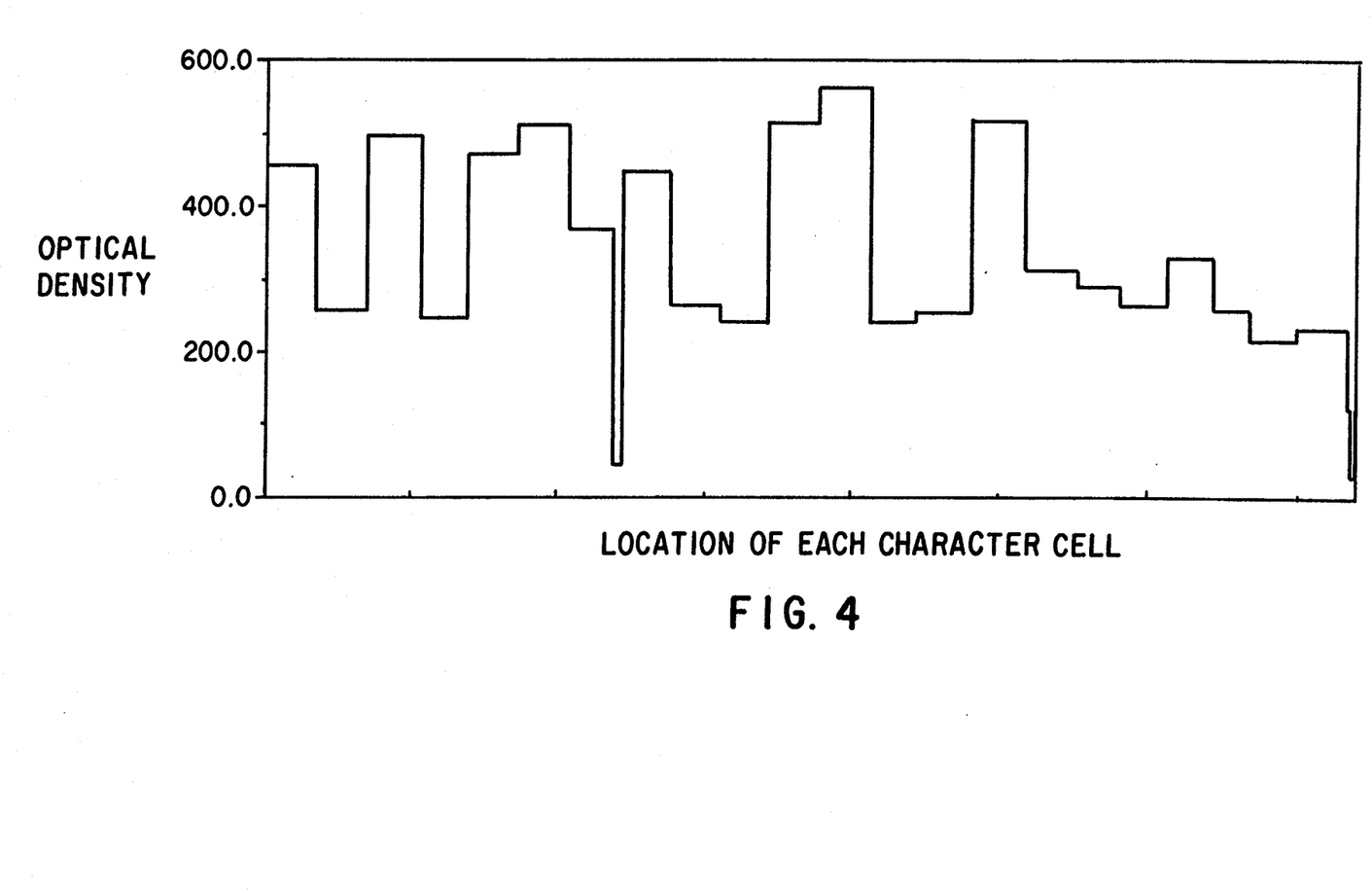
FIG. 4 shows a sample of Japanese text and the resulting optical density function.
Figure 5:
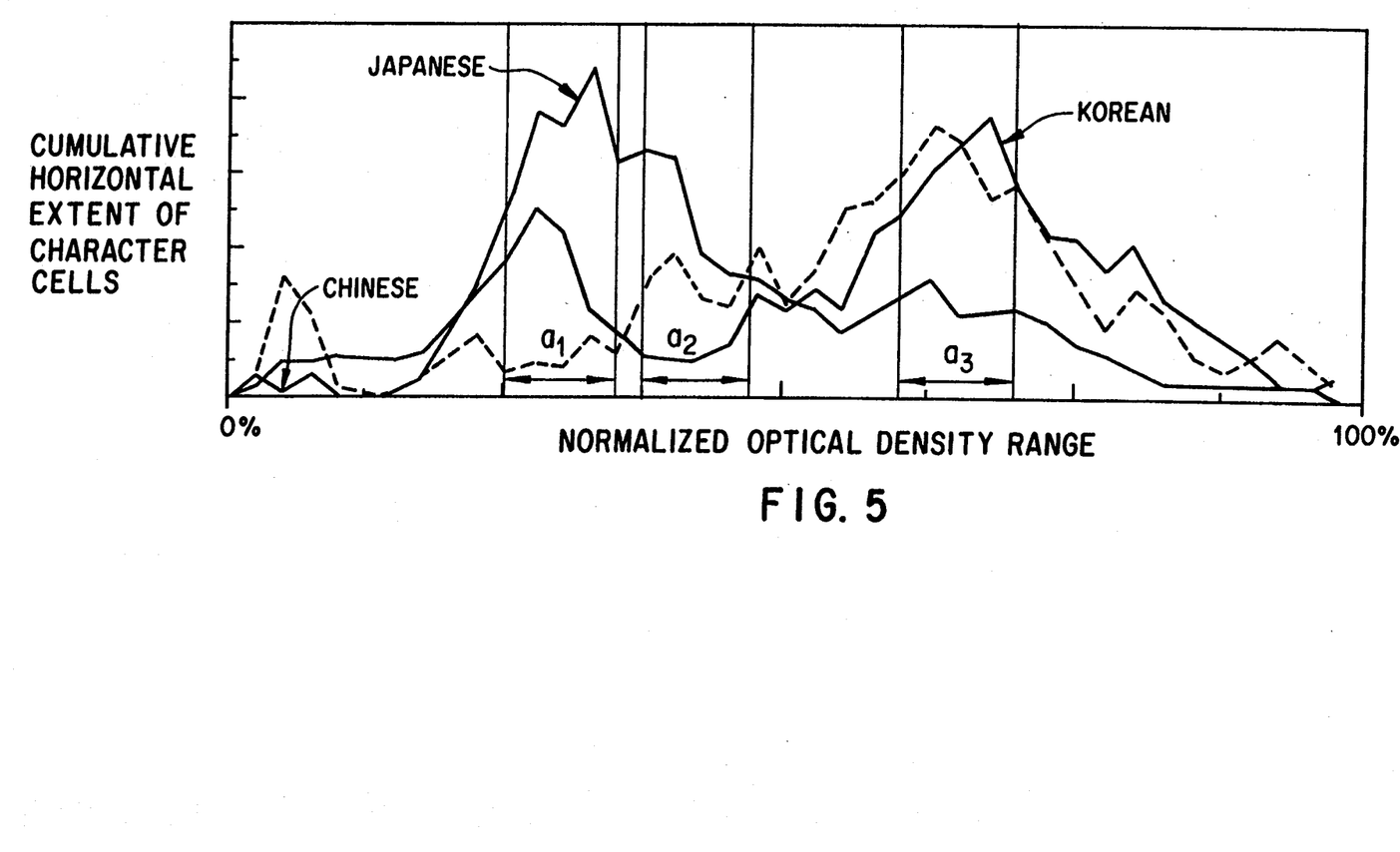
FIG. 5 shows a histogram of the optical densities of generalized Korean, Chinese and Japanese texts.

In any case, in the first preferred embodiment of the present invention, the feature determining means 34 is set up to determine the optical density, or total number of pixels having an image density greater than a predetermined value, of each character cell. FIG. 4 shows another sample of Japanese language text, and the optical density of the character cells due to the at least one connected component within each character cell against the location data for each character cell. The y axis of FIG. 4 represents the number of "on" pixels in a character cell while the x axis reflects the distance (not counting intercharacter space) for each character cell along the line of text in units of pixels. Thus, FIG. 4 shows the optical density of each character cell in a document. Optical density is a total number of pixels having an image density greater than a predetermined value. The list of character cells and the corresponding list of image density values are output from the feature determining means 34 to the language determining means 36. In the first preferred embodiment, the language determining means 36 first generates a histogram of the optical densities of the character cells of the text portion 104 like the ones shown in FIG. 5. It should be noted that the horizontal extent of the intercharacter spaces (i.e, those locations where the optical density function drops to zero) is not included in the histogram of FIG. 5. In the histograms of FIG. 5, the optical density range is shown on the X-axis and the total or cumulative horizontal extent of the character cells containing the values of the optical density is shown on the y-axis. For example, the normalized optical density range extends between 0 and 100%. The y axis reflects the cumulative horizontal extent of character cells. The cumulative horizontal extent is determined using a histogram such as that of FIG. 4. As an example, a specific y value of FIG. 4 is examined across the entire histogram of the line of text. At each "plateau" of a respective y level (in FIG. 4), the x "widths" of the character cell at that "plateau" are added together to determine the horizontal extent at that respective optical density. Then the total horizontal extent for a respective optical density is plotted versus the normalized optical density range between 0% and 100% in FIG. 5. As shown in FIG. 5, the generalized histograms for Korean, Chinese and Japanese language texts are easily distinguished.

Because the method and apparatus of the present invention are statistically based, they are very robust and can withstand even a very poorly printed and/or scanned document. That is, it is not necessary for the digital data signal or the connected components generated from the digital data signal to perfectly represent every character of the document. Rather, the present invention is able to withstand such common scanning errors such as splitting a single connected component character into two or more connected components or merging two or more separate connected components into a single connected component.

Figure 6:
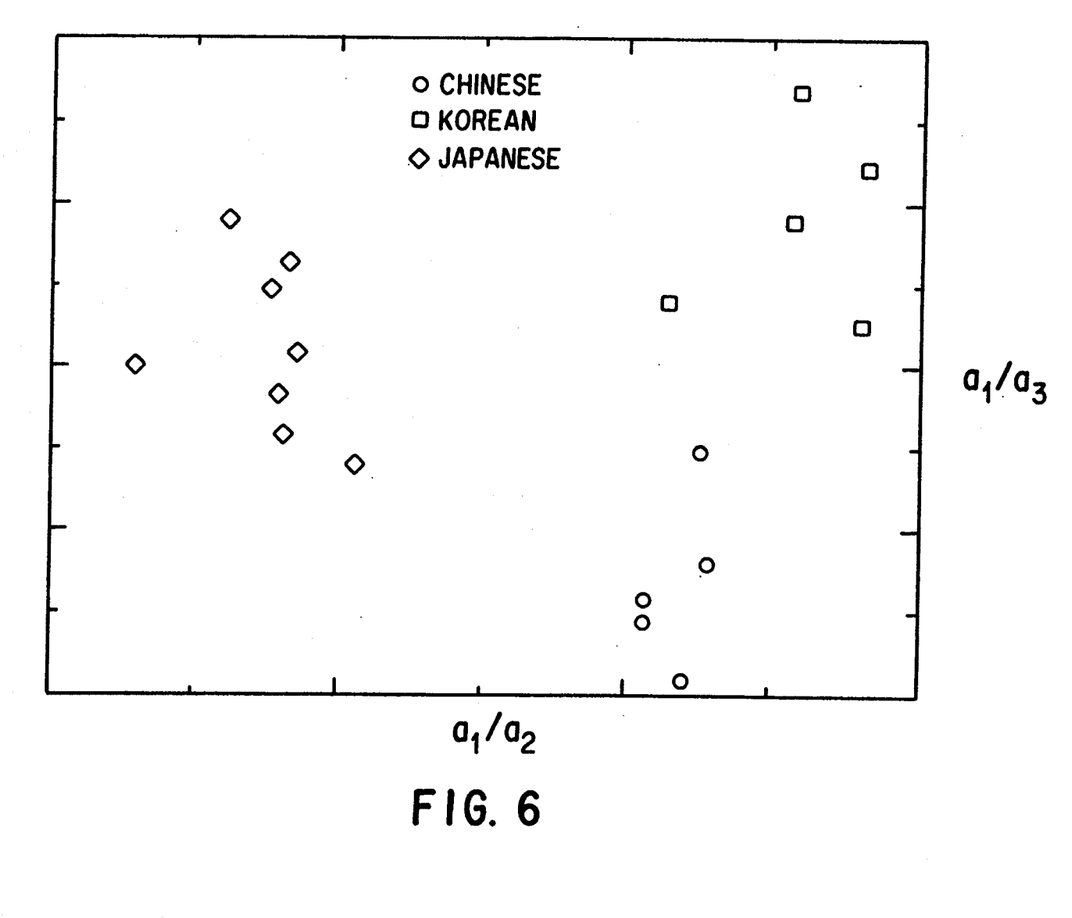
FIG. 6 shows a Linear Descriminant Analysis conversion of FIG. 5.

However, it would be difficult to compare the histograms of the generalized Asian language texts with the histogram of the text portion 104 of image 102 to determine the particular language of the text portion. Accordingly, the three generalized histograms are converted by linear discriminant analysis (LDA) to a new coordinate space. In the new coordinate space, the variables have equal variance and are uncorrelated. As shown in FIG. 6, the new coordinate space has three non-overlapping regions corresponding to each of the three histograms of the generalized Korean, Chinese and Japanese language texts. As one example of how to form the coordinate space shown in FIG. 6, the area under 10% of the distribution curve of FIG. 5 is determined and plotted. For example, three areas $a_1$, $a_2$ and $a_3$ are summed together for each language text. Ratios of these areas such as $a_1/a_2$ and $a_1/a_3$ are then plotted. Each of the Chinese, Japanese and Korean language texts is clearly distinguished based on the scatter plot.

The language determining means 36 converts the histogram of the text portion 104 of image 102 by LDA to a point in the new coordinate space. The Asian language corresponding to the generalized-language region of the new coordinate space, into which the point falls or is closest to, is determined as the particular Asian language for the text portion 104.

Once the language determining means 36 has determined the particular Asian language for the text portion 104 of image 102, the results of the language determining means 36 can be directly output to an optical character recognition means for selecting the optimal optical character recognition algorithms or training sets for the script and the language determined by the apparatus and method of the present invention. Alternately, the results, along with the text portion 104, can be stored in memory 112 for delayed processing.

Figure 7:
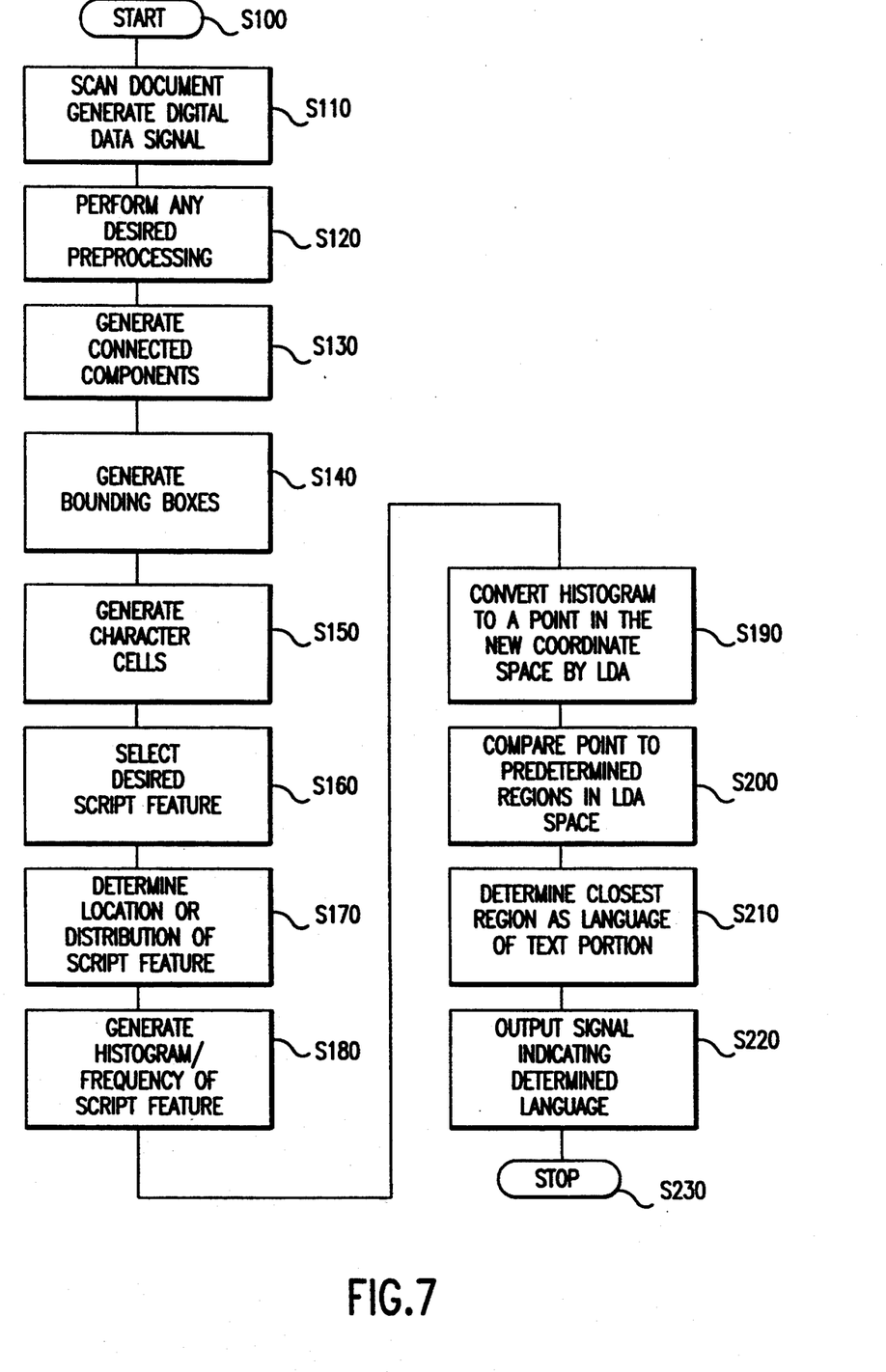
FIG. 7 a flow chart of the Asian language determination method of the present invention.

A simplified flowchart of the operation of the script determining system set forth above is shown in FIG. 7. In step S100, the system starts, and the document is scanned in step S110 to generate the digital data signal. The digital image data signal is then cleaned-up by applying any desired preprocessing algorithms to the digital image data signal in step S120. In step 130, the connected components of the digital image data signal are identified and in step S140, the bounding boxes for each of the determined connected components are determined.

In step S150, the character cells of the text portion 104 are generated. In step S160, the script feature to be determined is selected. In the preferred embodiment, the preferred feature is the optical density of the character cells. In step S170, the optical density of each character cell is determined.

Then, in step S180, a histogram of the distribution of determined or located features (the total or cumulative horizontal extent of the optical densities of the character cells in the preferred embodiment) for the text portion 104 is generated. In step S190, the determined histogram converted by LDA to a location on the new coordinate space. In step S200, the location of the text portion 104 is compared with the regions in the new coordinate space corresponding to generalized text portions of a plurality of different Asian languages to determine the particular Asian language of the text portion 104. In step S210, the Asian language corresponding to the region which is closest to the point is selected as the language of the text portion 104. Finally, in step S220, the particular Asian language of the text portion 104 is output and the system stops in step S230.

While the invention has been described with reference to particular preferred embodiments, the invention is not limited to the specific examples given, and other embodiments and modifications can be made by those skilled in the art without the departing from spirit and scope of the invention and claims.

What is claimed is:

1. An automatic language determining system for determining a language of an Asian script text portion of an image of a document, the Asian script text portion including alphanumeric elements, phonetic elements, ideographic elements or pictographic elements, the system comprising:

> input means for inputting a digital data signal representative of the script text portion, the digital data signal comprising a plurality of signal portions, each signal portion corresponding to one of a plurality of pixels;
>
> connected component generating means for generating at least one connected component from the plurality of signal portions;
>
> feature determining means for locating script features corresponding to at least one preselected type of script feature in at least one connected component; and
>
> language determining means for comparing a distribution of the located script features with at least one predetermined script feature distribution of a plurality of Asian languages and for determining the Asian language of the script text portion in response to the comparison.

2. The automatic language determining system of claim 1, wherein the feature determining means comprises:

> bounding box generating means for generating, for each at least one connected component, a bounding box of the plurality of signal portions for each said connected component; and
>
> character cell generating means for generating a plurality of character cells, each character cell comprising at least one connected component.

3. The automatic language determining system of claim 2, wherein the feature determining means further comprises optical density determining means for determining optical densities of the plurality of character cells.

4. The automatic language determining system of claim 3, wherein the optical density corresponding to each character cell of the plurality of character cells is normalized to an area of said character cell.

5. The automatic language determining system of claim 3, wherein the language determining means comprises means for generating a histogram corresponding to the optical densities of the plurality of character cells.

6. The automatic language determining system of claim 5, wherein the language determining means further comprises LDA generating means for converting, by linear discriminant analysis, the histogram to a point in a variable-space, > comparing means for comparing the point with a plurality of predetermined regimes in the variable space, and
>
> output means for outputting a determined language for the script text portion in response to the comparison.

7. The automatic language determining system of claim 1, wherein the plurality of Asian languages comprises at least one of Korean, Chinese and Japanese languages.

8. An automatic language determining system for determining an Asian language of an Asian script text portion of an image on a document, the Asian script text portion including alphanumeric elements, phonetic elements, ideographic elements or pictographic elements, the system comprising:

> a scanner for scanning the document and outputting a digital data signal representative of the image on the document, the digital data signal comprising a plurality of signal portions, each signal portion comprising data representative of a corresponding one of a plurality of pixels of the image;
>
> a memory for storing the digital data signal; and
>
> a controller for determining the Asian language of the script text portion of the image, comprising:
>
>> connected component generating means for determining at least one connected component from the plurality of signal portions;
>>
>> feature determining means for locating script features, corresponding to at least one predetermined type of script feature, for each at least one connected component;
>>
>> feature distribution determining means for determining a distribution of the located script features;
>>
>> comparison means for comparing the determined feature distribution to predetermined feature distributions of at least one Asian language; and
>>
>> output means for outputting a signal indicative of a determined language of the script text portion.

9. The automatic language determining system of claim 8, wherein the feature determining means comprises:

> a character cell determining means for determining a plurality of character cells, each one of the plurality of character cells comprising at least one connected component.

10. The automatic language determining system of claim 9, wherein the feature determining means further comprises feature selecting means for selecting at least one script feature to be located.

11. The automatic language determining system of claim 9, wherein the at least one predetermined script feature is optical density.

12. A method for automatically determining an Asian language of an Asian script text portion of a document, the Asian script text portion including alphanumeric elements, phonetic elements, ideographic elements or pictographic elements, the method comprising the steps of:

> determining at least one connected component from a plurality of pixels comprising the script text portion;
>
> determining locations of script features of the script text portion based on the at least one connected component corresponding to at least one preselected type of script feature;
>
> determining a distribution corresponding to each at least one preselected type of script feature for the located script features;
>
> comparing the feature distribution of the located script features with at least one predetermined feature distribution for at least one Asian language; and
>
> determining the Asian language based on the comparison of the comparing step.

13. The method of claim 12, further comprising the step of determining a plurality of character cells of the script text portion, each character cell comprising at least one connected component; wherein the at least one preselected type of script feature is optical density of the character cells.

* * * * *